United States Patent [19]

Green et al.

[11] Patent Number: 5,517,418
[45] Date of Patent: May 14, 1996

[54] SPACECRAFT DISTURBANCE COMPENSATION USING FEEDFORWARD CONTROL

[75] Inventors: James H. Green, Hermosa Beach; Loren I. Slafer; Bernard C. Soriano, both of Los Angeles, all of Calif.

[73] Assignee: Hughes Aircraft Company, Los Angeles, Calif.

[21] Appl. No.: 352,286

[22] Filed: Dec. 8, 1994

Related U.S. Application Data

[63] Continuation of Ser. No. 53,056, Apr. 26, 1993, abandoned.

[51] Int. Cl.$^6$ ..................................................... B64G 1/10
[52] U.S. Cl. .................................................................. 364/434
[58] Field of Search .................................. 364/434, 164, 364/459; 244/164, 165, 169, 170, 171

[56] References Cited

U.S. PATENT DOCUMENTS

| | | | |
|---|---|---|---|
| 3,785,595 | 1/1974 | Fischell | 244/15 A |
| 4,170,904 | 10/1979 | Fischell et al. | 244/166 |
| 4,422,330 | 12/1983 | Fischell | 73/517 R |
| 4,567,564 | 1/1986 | Bittner et al. | 364/434 |
| 5,042,752 | 8/1991 | Surauer et al. | 244/164 |
| 5,211,360 | 5/1993 | Zimbelman | 244/164 |

FOREIGN PATENT DOCUMENTS

| | | |
|---|---|---|
| 0544238 | 6/0293 | European Pat. Off. . |
| 2595147 | 9/1987 | France . |
| 2694821 | 2/1994 | France . |

OTHER PUBLICATIONS

Maund, "Direct Adaptive Control of Flexible Space Structures Using Neural Networks", 1992 IEEE, pp. 844–849.

Freeman, "Spacecraft On–Orbit Deployment Anomalies: What Can Be Done?", 17th Space Simulation Conference, Baltimore, Nov. 9, 1992 pp. 3–15.

Primary Examiner—Kevin J. Teska
Assistant Examiner—Stephen J. Walder, Jr.
Attorney, Agent, or Firm—Elizabeth E. Leitereg; Terje Gudmestad; W. K. Denson-Low

[57] ABSTRACT

A feedforward disturbance compensation system and method for use with a spacecraft that compensates for predictable disturbances exerted on the spacecraft. The invention comprises a model of the disturbance that is to be compensated, means for knowing when the disturbance will occur, and means for applying the feedforward compensation to the spacecraft in accordance with the model (a compensation profile). The present invention reduces pointing transients through the application of open-loop, feedforward compensation of actuators used to point the spacecraft. The shape of the feedforward profile is determined by an in-orbit test or is predicted by analytical means. For the in-orbit test case that compensates for an eclipse, for example, the spacecraft is flown through the eclipse once to determine the size and shape of the thermal shock disturbance and this information is stored in a spacecraft control processor. The application of the feedforward compensation is synchronized with the start and end of each day's eclipse. This may be achieved by sensing the change in battery discharge current that occurs in solar panels on the spacecraft, for example. On subsequent days, the invention anticipates the occurrence of the disturbance using the stored data. When the start or end of eclipse is detected, compensation for the expected disturbance is automatically applied to spacecraft actuators. The invention can also compensate for a large variety of known periodic disturbances other than thermal shock. These disturbances may be external or internal to the spacecraft. The present invention can also provide compensation by fine tuning the compensation magnitude and duration of the compensation, and is also applicable to both linear and nonlinear control systems.

20 Claims, 4 Drawing Sheets

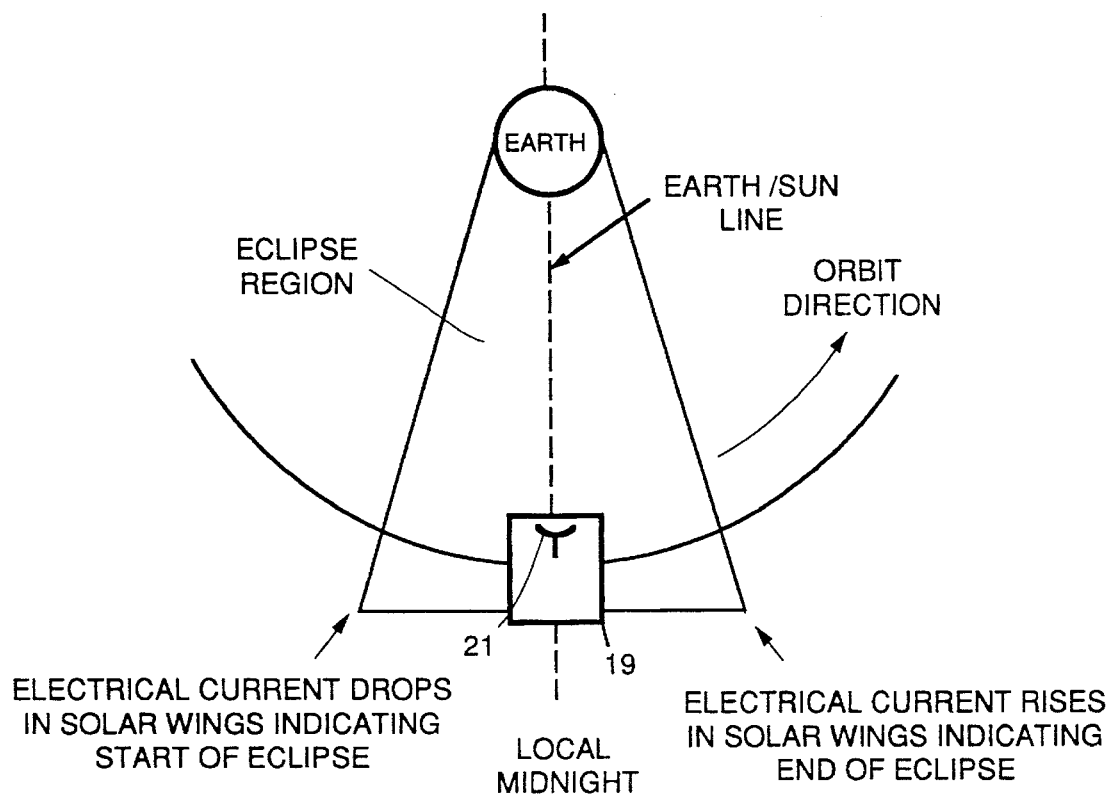
FIG. 3.
FIG. 4.
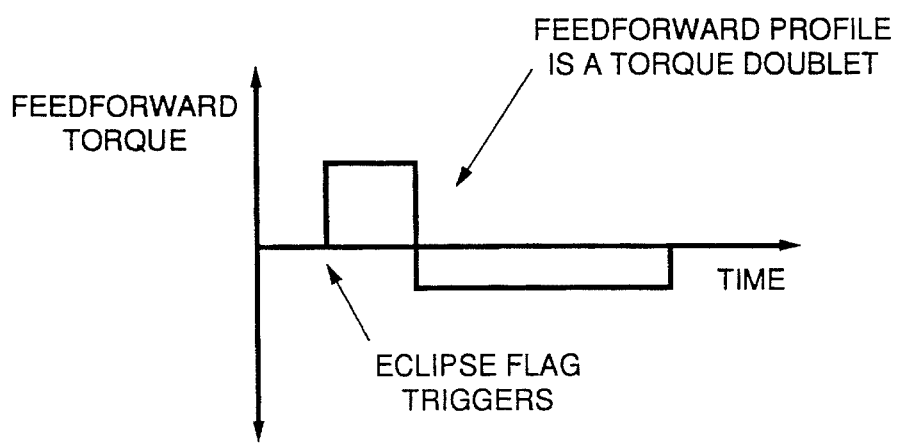

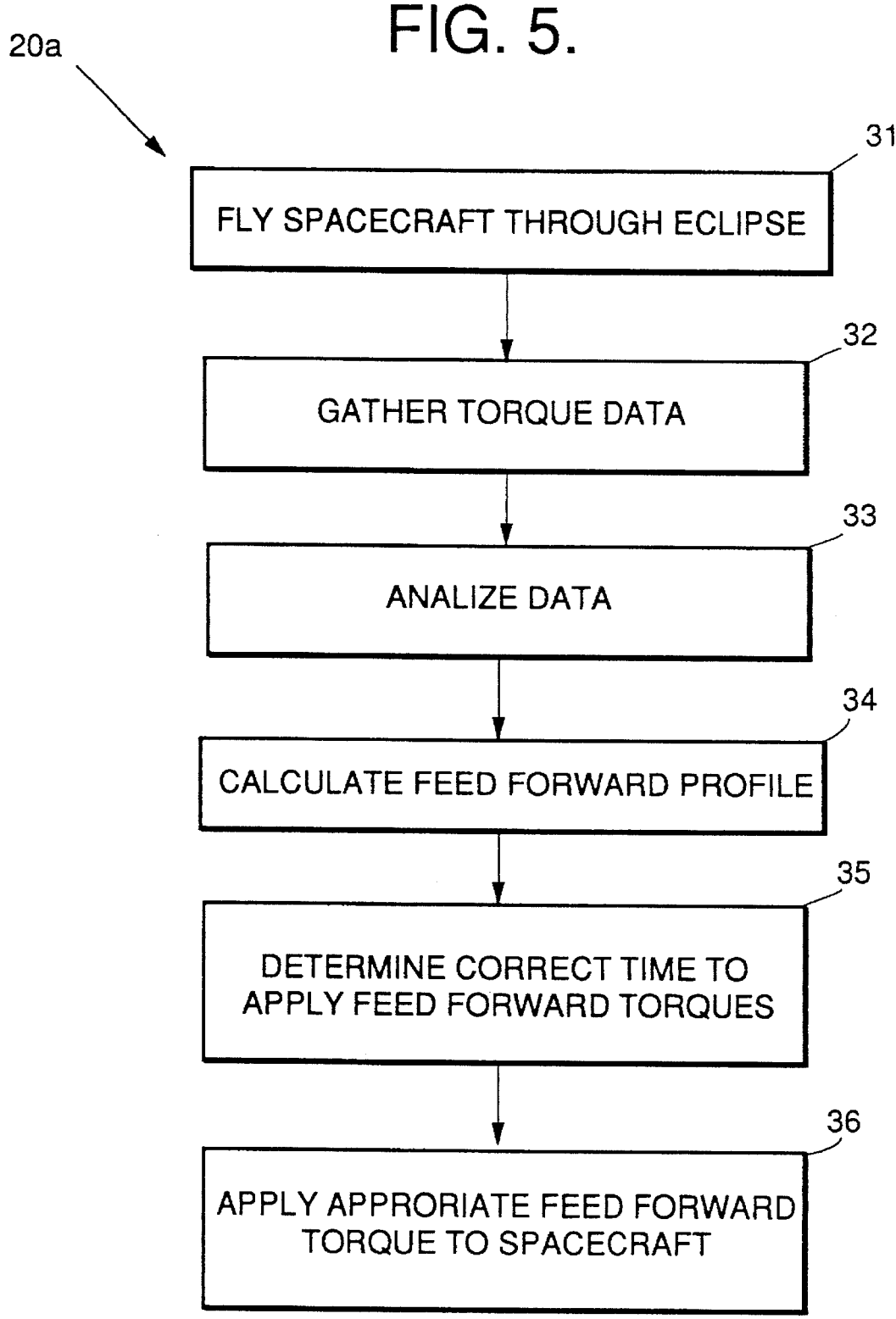

SPACECRAFT DISTURBANCE COMPENSATION USING FEEDFORWARD CONTROL

CROSS REFERENCE TO RELATED APPLICATIONS

This application is a continuation of application Ser. No. 08/053,056, filed: Apr. 26, 1993, now abandoned.

BACKGROUND

The present invention relates generally to disturbance compensation for orbiting spacecraft, and more particularly, to a feedforward control system and method that compensates for predictable disturbances that affect orbiting spacecraft.

When a spacecraft passes through the earth's shadow (known as an eclipse), it experiences a temperature change. A reduction in spacecraft temperature occurs upon entering the eclipse and a rise in spacecraft temperature occurs upon exiting the eclipse. This change in temperature affects all of the spacecraft components and appendages, such as antennas, for example. Some appendages, such as the solar wings, rapidly deform during this period. This phenomena, known as "thermal shock", causes errors in spacecraft pointing and, if left uncompensated, could disrupt services provided by communication systems on board the spacecraft.

The assignee of the present invention has produced numerous spacecraft in the past, and prior to the production of the Galaxy 601 model spacecraft, none of the spacecraft have compensation systems that explicitly compensate for eclipse thermal shock disturbances. In general eclipse disturbances are handled by a mode control system which is a closed loop control system that waits for a pointing transient to occur before compensation is applied.

Heretofore, thermal shock disturbances have been reduced by conventional closed loop methods. These methods require that a pointing error be sensed before any compensation can be applied. Also, the conventional closed loop schemes often require that the bandwidth of the system be raised to reduce the size of the pointing error due to eclipse thermal shock. The higher bandwidth has some negative side effects such as increased sensor noise transmission and reduced stability margins.

Accordingly, it is an objective of the present invention to provide a disturbance compensation system and method for use with a spacecraft that compensates for predictable disturbances exerted thereon. It is a further objective of the present invention to provide for a thermal shock compensation system and method that controls the spacecraft during an eclipse and reduces the effects of thermal shock thereon.

SUMMARY OF THE INVENTION

In order to provide for the above and other objectives, the present invention comprises a control system and method for controlling a spacecraft in the presence of predictable disturbances. The control system includes a closed loop control system, an open loop compensation system whose output signals are combined with those of the closed loop control system, and a physical system that is perturbed by a predictable disturbance. The physical system is compensated by the combined output signals from the closed loop and open loop compensation systems. The feedforward control system compensates for known (predictable) disturbances and the closed loop control system provides robustness for the system. The closed loop and open loop control systems taken together comprise an attitude control system that is adapted to accurately control the attitude of the spacecraft in the presence of predictable disturbances.

Typical disturbances occur during eclipses, for example, and the present invention reduces the effects of such disturbances. These particular disturbances are known as thermal shock and the present thermal shock control system and method reduces pointing transients through the application of open-loop, feedforward compensation of actuators used to point the spacecraft. The shape of the feedforward profile is determined by an in-orbit test and the application of the feedforward compensation is synchronized with the start and end of each day's eclipse. This is accomplished by sensing the change in some value from the spacecraft operating environment, such as battery discharge current that occurs in solar panels on the spacecraft. It has been shown that, with the present compensation method, strict spacecraft pointing requirements can be met even in the presence of large thermal shock disturbances.

Eclipse feedforward control allows the pointing disturbance caused by thermal shock at the beginning and end of the eclipse to be reduced without raising the bandwidth of the control system. The feedforward compensation algorithm used in the present invention works because the thermal shock disturbance from an eclipse is generally the same from day to day. The spacecraft is flown through eclipse once to determine the size and shape (profile) of the thermal shock disturbance and this information is stored in a spacecraft control processor. The profile may be computed at an earth station and uploaded to to the control processor using a communication link, for example. On subsequent days, the present feedforward control method anticipates the occurrence of the disturbance using the stored data. When the start or end of eclipse is detected, compensation for the expected disturbance is automatically applied to the spacecraft actuators.

Because the present eclipse feedforward method is an open-loop scheme, compensation may be applied before a pointing error develops. Thus, it is not necessary to sense a pointing error before compensation is applied, as in conventional closed loop systems. The present eclipse feedforward control method does not have the drawbacks of the conventional closed loop schemes relating to increased bandwidth, increased sensor noise transmission, and reduced stability margins discussed above, since it is an open-loop compensation method.

For the HS601 class of spacecraft produced by the assignee of the present invention, the present invention provides a feature for accommodating strict pointing requirements throughout the life of the spacecraft. Pointing requirements need not be relaxed during eclipse seasons and the spacecraft performance is enhanced, and strict pointing requirements can be met. Larger solar wings and antennas may be added to future satellites and the effect of these additional appendages on spacecraft pointing can be minimized. With larger solar wings, and antennas, the payload capability of future satellites can be greatly increased. Consequently, the present invention significantly increases the state of the art of eclipse thermal shock control and is a significant part of the spacecraft attitude control system. It is a feature that is specifically adapted for use on all HS601 class spacecraft.

The present invention is also flexible, in that it can also compensate for a large variety of known periodic disturbances other than thermal shock. These disturbances may be either external or internal in nature. For example, moving an appendage will cause antenna (spacecraft) pointing errors. This is effectively an internal disturbance and may be compensated in a closed loop sense. An error is detected due to the disturbance and the present system compensates for the error. However, the present invention can also compensate for the movement of the appendage. This is accommodated by fine tuning the compensation magnitude and duration. The present invention is also applicable to both linear and nonlinear control systems. These types of systems are on spacecraft that operate in any orbit configuration.

Accordingly, and in general, the present invention provides for a disturbance compensation system and method for use with a spacecraft that compensates for predictable disturbances exerted on the spacecraft. In general, then, the present invention comprises a model of the disturbance that is to be compensated, means for knowing when the disturbance will occur, and means for applying the feedforward compensation in accordance with the model (a compensation profile) to the spacecraft.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates how feedforward torques are applied in accordance with the principles of the present invention to achieve spacecraft control;

FIG. 4 illustrates a graph of feedforward torque versus time applied to a spacecraft using the control system of FIG. 2; and FIG. 5 shows a flow chart illustrating and embodiment of a method in accordance with the principles of the present invention.

DETAILED DESCRIPTION

By way of introduction, when disturbances are predictable, a very effective method of compensation is to use feedforward control. The corrective motion provided by the feedforward control effectively cancels perturbations caused by the disturbances. The thrust of the present invention is described below using thermal shock disturbances (which are very predictable) as an example. However, it is to be understood that the present invention is not limited to compensation of thermal shock disturbances.

Figure 1:
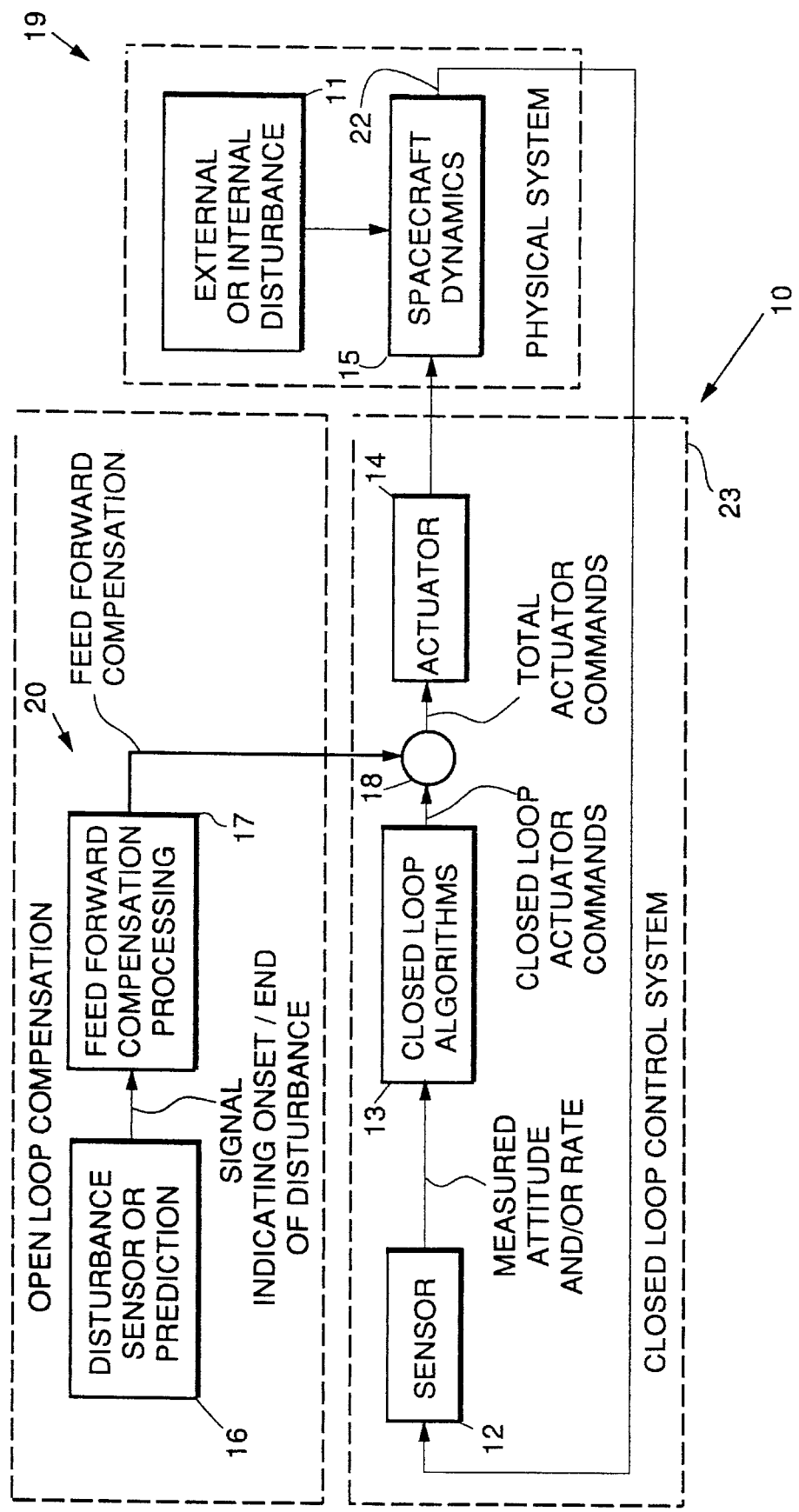
FIG. 1 illustrates a block diagram showing generic feedforward disturbance control in accordance with the principles of the present invention.

Referring to FIG. 1, it illustrates a block diagram showing a generic feedforward disturbance control system 10 in accordance with the principles of the present invention. The feedforward disturbance control system 10 implements a feedforward control method 20 in accordance with the principles of the present invention that compensates for known (predictable) external or internal disturbances 11. The feedforward disturbance control system 10 is adapted for use with a spacecraft 19 that includes a spacecraft control system 23, actuators 14, and spacecraft dynamics 15 which are part of the physical system. Sensors 12 that are disposed on the spacecraft 19 and form part of the spacecraft control system 23 are coupled to a sensor processor 12 that processes error signals generated by the sensors 12 using closed loop algorithms to generate closed loop actuator commands that are normally applied to the actuators 13. The present feedforward control system 10 is adapted to compensate for the known (predictable) external or internal disturbances 11 that affect the spacecraft dynamics 15.

The feedforward control system 10 and method 20 are implemented using a disturbance sensing/prediction sensor/processor 16 coupled to a feedforward compensation processor 17. The disturbance sensing/prediction sensor/processor 16 provides a signal indicative of the onset and end of a disturbance that initiate processing by the feedforward compensation processor 17. Output signals from the feedforward compensation processor 17 comprise feedforward compensation commands that are combined with the closed loop actuator commands from the actuator control system 13 in a mixer 18 to provide total actuator commands that are applied to the actuators 14.

The disturbance sensing/prediction sensor/processor 16 generates a signal or flag that is used by the feedforward compensation processor 17 that indicates that the disturbance is present. The disturbance sensing/prediction sensor/processor 16 may provide this signal by measuring some value from the spacecraft operating environment, such as battery discharge current or solar wing current, for example, that directly or indirectly indicates that the disturbance is occurring. In addition, the disturbance may also be predicted, such as by predicting eclipse start and end times based upon the time of day and time of year, for example.

The feedforward control system 10 and method 20 may be used to compensate for any known disturbance, and the shape of the profile needed to compensate for the disturbance is not important. In general, what is needed to implement the present invention is a model of the disturbance, means for knowing when the disturbance will occur, and means for applying the necessary feedforward compensation.

Figure 2:
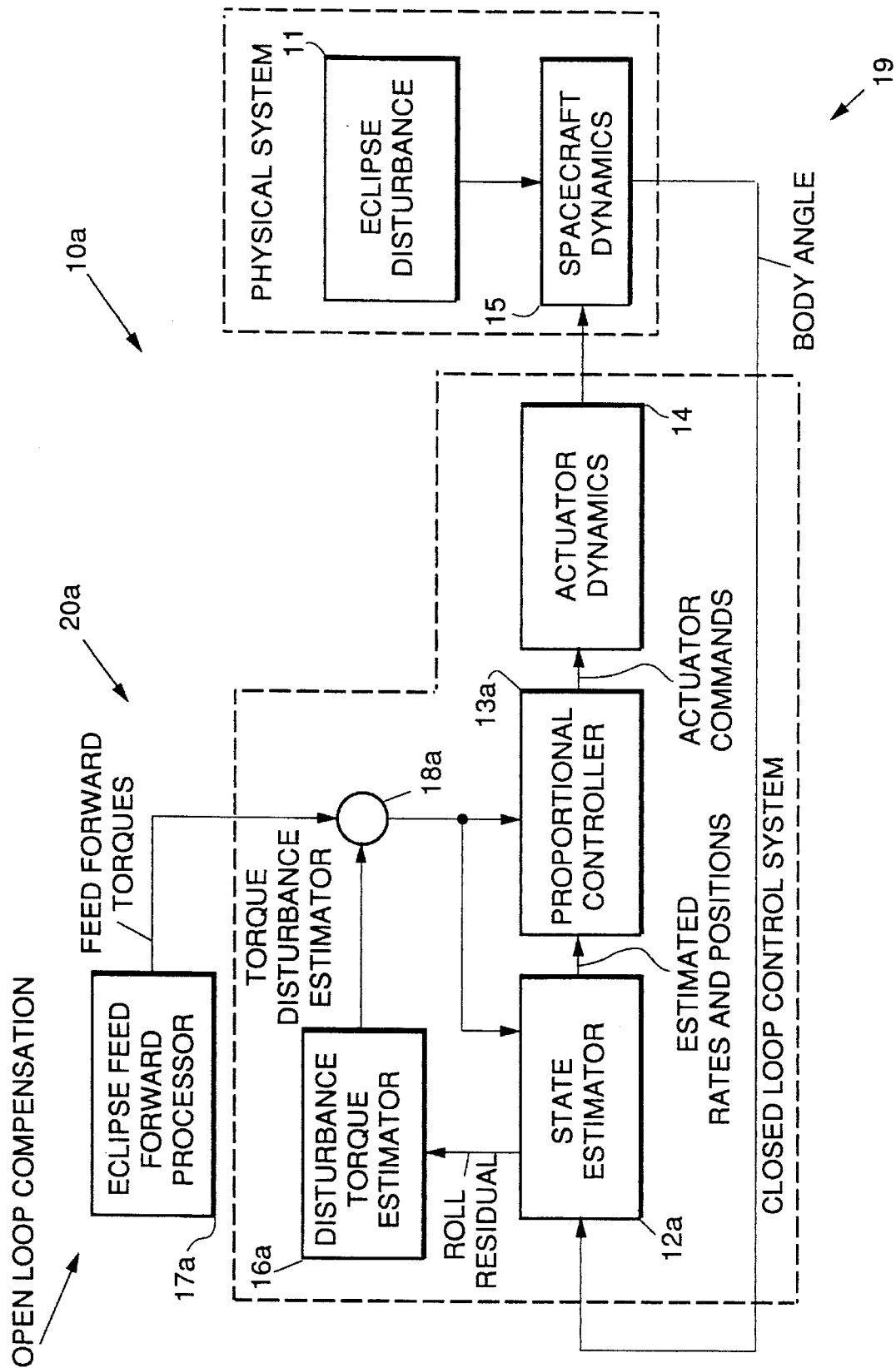
FIG. 2 illustrates a specific embodiment of a feedforward disturbance control system and method shown in FIG. 1, and more particularly, a control system that implements an eclipse feedforward control method in accordance with the principles of the present invention.

FIG. 2 illustrates one specific embodiment of the feedforward control system 10 of FIG. 1. FIG. 2 shows an eclipse feedforward control system 10a for use with the spacecraft 19 that implements an eclipse feedforward control method 20a in accordance with the principles of the present invention. The control system 10a is comprised of a state estimator 12a which is adapted to output roll residual error signals derived from body angle data derived from the spacecraft dynamics 15 that are applied to an input of a disturbance torque estimator 16a. The state estimator 12a is coupled to a first input of a proportional controller 13a whose output comprises actuator commands that are control the actuator dynamics 14 of the spacecraft 19. The actuator dynamics 14 is in turn is coupled to the spacecraft dynamics 15 that controls the orientation of the spacecraft 19. The disturbance torque estimator 16a has an output that is coupled by way of a summing device (mixer) 18a to a second input of the proportional controller 13a. The body angle feedback signals are generated by the spacecraft dynamics 15 and are coupled as feedback signals to an input of the state estimator 12a.

The method 20a of the present invention is implemented in an eclipse feedforward circuit 17a that is coupled by way of the summing device 18a to the proportional controller 13a. The eclipse feedforward circuit 17a implements the present method 20a and provides feedforward torques that are combined in the summing device 17 with disturbance torque estimates provided by the disturbance torque estimator 16a.

FIG. 3 illustrates the timing of feedforward torques using the method 20a to achieve control of the spacecraft 19. FIG. 3 shows an operational environment of the spacecraft 19 that is orbiting the earth. When the spacecraft 19 progresses to a point where the earth is between it and the sun, an eclipse of the spacecraft 19 occurs, illustrated by the shaded area in FIG. 3. When the spacecraft 19 enters into the earth's shadow, the electrical current generated by solar wings 21 (solar panels) on the spacecraft 19 drops, indicating the start of the eclipse. This generates a first eclipse flag signal that triggers start of application of the feedforward torques. Similarly, when the spacecraft 19 exits from the earth's shadow, the electrical current generated by solar wings 21 rises, indicating the end of the eclipse. This generates a second eclipse flag signal that triggers the end of the application of the feedforward torques.

Pointing transients experienced by the spacecraft 19 as it enters and exits the eclipse are caused by rapid deformation of its appendages, such as the solar wings 21. The method 20a of the present invention treats the thermal shock disturbance (eclipse) as if it is a known external torque on the spacecraft 19. The fact that the eclipse disturbance is repeatable from one eclipse to the next is used to generate a model of the eclipse torques exerted on the spacecraft 19. The estimated eclipse disturbance torque derived from one eclipse is then used to compensate for the disturbances generated by future eclipses.

Referring to FIG. 4, one feedforward torque profile that may be applied using the present invention is a torque doublet. FIG. 4 illustrates a graph of feedforward torque versus time for the control system 10a of FIG. 2. A constant torque is modeled for a period of time, then a second torque level is modeled for a second different period of time. The magnitude and the duration of both portions of the doublet are adjusted by earth-based controllers, for example, and controlled by way of a communication link between the earth and the spacecraft 19, for example. Separate torque profiles are applied to roll and yaw axes of the spacecraft 19. The magnitude of the torque doublets are individually adjusted between roll and yaw, but the duration of the torques are the same. Separate torque profiles are specified for the entering and exiting eclipse transients. The magnitudes and durations of the torque doublet may be set separately between the entering and exiting profile.

The feedforward torque is applied when the beginning or the end of the eclipse is detected. An eclipse is assumed to have started whenever the electrical current from the solar wings 21 on the spacecraft 19 drops below a threshold for a period of time, indicating that the wings are no longer exposed to sunlight. The eclipse is assumed to be completed whenever the current from the wings 21 rises above a different threshold for a period of time. By sensing the transitions into and out of eclipse, the feedforward torques are reliably applied at the correct time. This is illustrated in FIG. 4.

The control system 10a generates estimates of environmental disturbance torques using the disturbance torque estimator 16a. The control system 10a has been designed to compensate for these estimated disturbance torques by applying an opposing, internal torque using a double gimballed momentum wheel. Known external torques are negated in this manner with no pointing error. The eclipse feedforward control method 20a of the present invention generates a disturbance torque profile that approximates the eclipse disturbance. This is generated in the eclipse feedforward processor 17a. This eclipse disturbance torque profile is summed with estimates of environmental disturbance torques in the summing device 18a. Since the control system 10a has been designed to compensate for known disturbances without generating any pointing error, the thermal shock transient is negated to the extent that the eclipse torque profile matches the actual disturbance and smaller pointing errors result.

Referring to FIG. 5, it shows a flow diagram illustrating the details of the eclipse feedforward method 20a. In the method 20a, a thermal shock torque profile representative of the thermal shock disturbance caused by the eclipse is determined. A feedforward torque profile to be used for the spacecraft 19 is determined through on-orbit testing of the spacecraft 19. The spacecraft 19 is flown through an eclipse (step 31) and telemetry data of the attitude of the spacecraft 19 is captured (step 32). This data is then analyzed to determine the shape of the actual eclipse thermal disturbance (step 33). The best feedforward profile is then calculated and stored (uploaded from an earth station) to the spacecraft 19 (step 34) and is used for subsequent eclipses. Since the eclipse disturbance is repeatable from day-to-day, the pointing disturbance is greatly reduced. The next step comprises determining the correct time to apply the calculated and stored feedforward control torques (step 35). This is accomplished by sensing the change in battery discharge current that occurs in the solar panels 21 on the spacecraft 19 and applying the appropriate feedforward torques when the current changes. The next step comprises controlling the spacecraft 19 based on the derived feedforward torques (step 36).

A computer-implemented software algorithm that implements eclipse feedforward control method 20a of the present invention has been successfully tested in a mixed simulation test environment. This testing was completed with a flight version of a spacecraft control processor using a simulated spacecraft 19 and operating environment. The present eclipse feedforward control method 20a has been shown to provide for reliable compensation for simulated eclipse transients and the thermal shock resulting therefrom.

Although a torque doublet has been described in the above example, the feedforward profile may have any shape necessary to compensate for the thermal shock disturbance, or other disturbance that is to be compensated. The choice of a torque doublet is a very simple example of one possible torque profile. Also, a large number of other methods may be employed to sense the onset and end of the eclipse, or other compensatable disturbance. Alternatives to sensing battery discharge current include sensing wing or electrical bus temperature changes, or incorporating a sun sensor on the spacecraft to measure incident sunlight. Eclipse entry and exit may also be predicted using information about the time of day and the time of year. Also, for certain spacecraft configurations, the shape and magnitude of the feedforward profile may be calculated analytically, thereby eliminating the need for an on-orbit test.

In summary, and in view of the above, the present invention provides for a control system that includes a closed loop control system, an open loop compensation system whose output signals are combined with those of the closed loop control system, and a physical system that is perturbed by a predictable disturbance that is compensated by the combined output signals from the closed loop control system and the open loop compensation system. The feedforward compensation system is most often used to augment the closed loop control system. The feedforward control system compensates for known disturbances and the closed loop control system provides robustness for the system. The closed loop and open loop control systems taken together provide for an attitude control system that is adapted to accurately control the attitude of the spacecraft in the presence of predictable disturbances.

Thus there has been described a new and improved control system and method that provides thermal shock compensation for orbiting spacecraft using feedforward control. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A spacecraft control system that compensates for thermal shock induced in the spacecraft due to an eclipse, and wherein the spacecraft includes actuator dynamics that are coupled to spacecraft dynamics, said control system comprising:

a state estimator that is adapted to output a roll residual error signal indicative of the difference between the roll angle estimate and the roll angle measurement and estimated rate and position signals indicative of the spacecraft angular positions and rates in response to a body angle feedback signal derived from the actuator dynamics of the spacecraft;

a proportional controller coupled to the state estimator for providing actuator command signals;

an actuator control system coupled to the proportional controller for processing the actuator command signals to control actuators on the spacecraft;

a spacecraft coupled to the actuator control system that is adapted to provide the body angle feedback signal to the state estimator;

a disturbance torque estimator for processing the roll residual error signal and providing signals indicative of estimates of disturbance torques;

an eclipse feedforward circuit for providing predetermined feedforward torque signals that are adapted to reduce the effects of thermal shock on the spacecraft caused by an eclipse thereof; and a summing device coupled between the disturbance torque estimator and the proportional controller and between the eclipse feedforward circuit and the proportional controller that combines the predetermined feedforward torque signals and the disturbance torque signals to reduce the effects of thermal shock on the spacecraft caused by the eclipse.

2. The control system of claim 1 wherein the predetermined feedforward torques are comprised of a torque doublet having a first constant torque level modeled for a first period of time corresponding to entry into the eclipse, and a second constant torque level modeled for a second different period of time corresponding to exit from the eclipse.

3. The system of claim 1 wherein separate and distinct torque profiles are applied to control roll and yaw axes of the spacecraft to provide for independent control thereof.

4. The system of claim 3 wherein the magnitude of the torque doublets are individually adjusted for the roll and yaw axes of the spacecraft, and the duration of the torques are the same for each axis.

5. A spacecraft control system for use with a spacecraft that includes actuator dynamics that are coupled to spacecraft dynamics, said control system comprising:

a sensor for providing a measurement of the attitude of the spacecraft and for providing an output signal indicative thereof;

a closed loop control system coupled to the sensor for processing the output signal from the sensor and for providing a timing signal indicative of the time of occurrence of a predictable transient disturbance that affects the spacecraft;

a summing device coupled between the closed loop control system and the actuator dynamics; and a feedforward compensation processor coupled between the disturbance sensor/predictor and to the summing device for storing predetermined feedforward compensation signals that are intended to compensate for the predictable transient disturbance and for outputting the predetermined feedforward compensation signals in response to the timing signal provided by the disturbance sensor/predictor that are combined in the summing device with the actuator command signals provided by the actuator control system to reduce the effects of the predictable transient disturbance on the spacecraft, wherein the predetermined feedforward compensation signals are comprised of a torque doublet having a first constant torque level modeled for a first period of time corresponding to entry into an eclipse, when the spacecraft passes through the earth's shadow, and a second constant torque level modeled for a second different period of time corresponding to exit from the eclipse.

6. The system of claim 5 wherein separate and distinct torque profiles are applied to control roll and yaw axes of the spacecraft to provide for independent control thereof.

7. The system of claim 6 wherein the magnitude of the torque doublets are individually adjusted for the roll and yaw axes of the spacecraft, and the duration of the torques are the same for each axis.

8. A spacecraft control system that compensates for a predictable disturbance induced in a spacecraft that includes actuator dynamics that are coupled to spacecraft dynamics, said control system comprising:

a sensor for providing a measurement of the attitude of the spacecraft;

a closed loop control system coupled to the sensor for processing the output signal from the sensor and for providing actuator command signals;

a disturbance sensor/predictor for providing a signal indicative of the occurrence of the disturbance;

a summing device coupled between the closed loop control system and the actuator dynamics; and a feedforward compensation processor coupled between the disturbance sensor/predictor and to the summing device for providing predetermined feedforward compensation signals that are combined with the actuator command signals provided by the actuator control system to reduce the effects of the disturbance on the spacecraft, and wherein the predetermined feedforward compensation signals are comprised of a torque doublet having a first constant torque level modeled for a first period of time corresponding to entry into an eclipse, when the spacecraft passes through the earth's shadow, and a second constant torque level modeled for a second different period of time corresponding to exit from the eclipse.

9. The system of claim 8 wherein separate and distinct torque profiles are applied to control roll and yaw axes of the spacecraft to provide for independent control thereof.

10. The system of claim 9 wherein the magnitude of the torque doublets are individually adjusted for the roll and yaw axes of the spacecraft, and the duration of the torques are the same for each axis.

11. A spacecraft control method that compensates for thermal shock induced in the spacecraft due to an eclipse, said control method comprising the steps of:

orbiting the spacecraft through the eclipse;

acquiring data regarding the attitude of the spacecraft prior to, during and after the eclipse;

analyzing the data to determine the shape of the thermal disturbance caused by the eclipse;

calculating desired feedforward torque profiles corresponding to entering and exiting eclipse transients for application to the spacecraft upon the occurrence of subsequent eclipses;

determining times to apply torques comprising the calculated feedforward torque profiles to the spacecraft by sensing when the spacecraft enters and exits the eclipse;

applying an appropriate feedforward torques to the spacecraft depending upon whether the spacecraft is entering or exiting the eclipse to control the spacecraft in response to the thermal shock.

12. The method of claim 11 wherein the feedforward control torque profiles are comprised of a torque doublet comprising a first constant torque level modeled for a first period of time corresponding to entry into the eclipse, and a second constant torque level modeled for a second different period of time corresponding to exit from the eclipse.

13. The method of claim 11 wherein the step of determining times to apply the calculated feedforward control torque profiles to the spacecraft comprises the step of:

sensing changes in battery discharge current that occurs in solar panels on the spacecraft.

14. The method of claim 11 wherein separate and distinct torque profiles are applied to control roll and yaw axes of the spacecraft.

15. The method of claim 14 wherein the magnitude of the torque doublets are individually adjusted for the roll and yaw axes of the spacecraft, and the duration of the torques are the same for each axis.

16. A spacecraft control method that compensates for thermal shock induced in the spacecraft due to an eclipse, said control method comprising the steps of:

orbiting the spacecraft through the eclipse;

acquiring data regarding the attitude of the spacecraft prior to, during and after the eclipse;

downloading the acquired data to an earth station;

analyzing the downloaded data to determine the shape of the thermal disturbance caused by the eclipse;

calculating desired feedforward torque profiles corresponding to entering and exiting eclipse transients;

uploading the calculated feedforward torque profiles to the spacecraft for application thereto upon the occurrence of subsequent eclipses;

determining times to apply torques comprising the calculated feedforward torque profiles to the spacecraft by sensing when the spacecraft enters and exits the eclipse;

applying the appropriate feedforward torque profiles to the spacecraft depending upon whether the spacecraft is entering or exiting the eclipse to control the spacecraft in response to the thermal shock.

17. The method of claim 16 wherein the feedforward control torque profiles are comprised of a torque doublet comprising a first constant torque level modeled for a first period of time corresponding to entry into the eclipse, and a second constant torque level modeled for a second different period of time corresponding to exit from the eclipse.

18. The method of claim 16 wherein the step of determining times to apply the calculated feedforward control torque profiles to the spacecraft comprises the step of:

sensing changes in battery discharge current that occurs in solar panels on the spacecraft.

19. The method of claim 16 wherein separate and distinct torque profiles are applied to control roll and yaw axes of the spacecraft.

20. The method of claim 19 wherein the magnitude of the torque doublets are individually adjusted for the roll and yaw axes of the spacecraft, and the duration of the torques are the same for each axis.

* * * * *